(12) United States Patent
Liu et al.

(10) Patent No.: US 10,880,540 B2
(45) Date of Patent: Dec. 29, 2020

(54) 3D DEPTH IMAGE ACQUIRING METHOD AND APPARATUS, AND IMAGE ACQUISITION DEVICE

(71) Applicant: PIONEER MATERIALS INC. CHENGDU, Sichuan (CN)

(72) Inventors: Hao-Che Liu, Sichuan (CN); Liu-Yuh Lin, Sichuan (CN); Liang-Chih Weng, Sichuan (CN); Tzu-Huan Cheng, Sichuan (CN); Chen-Hsin Wu, Sichuan (CN); Chien-Chun Liu, Sichuan (CN); Chien-Yao Huang, Sichuan (CN); Leon A Chiu, Sichuan (CN); Sau-Mou Wu, Sichuan (CN); Ti-Hsien Tai, Sichuan (CN); Yu-Hsiang Pan, Sichuan (CN)

(73) Assignee: PIONEER MATERIALS INC. CHENGDU, Sichuan (CN)

( * ) Notice: Subject to any disclaimer, the term of this patent is extended or adjusted under 35 U.S.C. 154(b) by 92 days.

(21) Appl. No.: 16/200,737

(22) Filed: Nov. 27, 2018

(65) Prior Publication Data
US 2019/0200002 A1    Jun. 27, 2019

(30) Foreign Application Priority Data

Dec. 22, 2017  (CN) .......................... 2017 1 1407809

(51) Int. Cl.
*G06K 9/00*       (2006.01)
*H04N 13/268*   (2018.01)
(Continued)

(52) U.S. Cl.
CPC .......... *H04N 13/268* (2018.05); *G01B 11/25* (2013.01); *H04N 5/2256* (2013.01);
(Continued)

(58) Field of Classification Search
CPC ............... H04N 13/268; H04N 13/271; H04N 5/232123; H04N 9/04553;
(Continued)

(56) References Cited

U.S. PATENT DOCUMENTS

| 2014/0240492 A1* | 8/2014 | Lee ..................... H04N 5/23219 348/136 |
| 2015/0055886 A1* | 2/2015 | Oh ..................... H04N 5/23238 382/284 |

(Continued)

FOREIGN PATENT DOCUMENTS

WO    WO-2016192437 A1 *   12/2016   ............. H04N 13/00

*Primary Examiner* — Van D Huynh
(74) *Attorney, Agent, or Firm* — Ballard Spahr LLP

(57) ABSTRACT

A 3D depth image acquiring method and apparatus, and an image acquisition device are provided. The method is applied to an image acquisition device comprising a VIS-NIR picture sensor and an infrared structured light projection component. The VIS-NIR picture sensor comprises a plurality of dot matrix units each having a blue light photosensitive component, a green light photosensitive component, a red light photosensitive component and an NIR photosensitive component distributed thereon. The method comprises: controlling the blue light photosensitive component, the green light photosensitive component, the red light photosensitive component, the NIR photosensitive component and the infrared structured light projection component to operate, to obtain an optimum NIR image and an optimum VIS image; and processing the optimum VIS image and a depth image which is obtained by performing calculation on the optimum NIR image using a 3D depth mode, to obtain a 3D depth image.

14 Claims, 5 Drawing Sheets

(51) Int. Cl.
*G01B 11/25* (2006.01)
*H04N 13/271* (2018.01)
*H04N 5/232* (2006.01)
*H04N 9/04* (2006.01)
*H04N 5/225* (2006.01)
*H04N 5/33* (2006.01)
*H04N 13/207* (2018.01)
*H04N 13/00* (2018.01)
*H04N 13/257* (2018.01)
*H04N 13/254* (2018.01)

(52) U.S. Cl.
CPC . *H04N 5/232121* (2018.08); *H04N 5/232123* (2018.08); *H04N 5/332* (2013.01); *H04N 9/04553* (2018.08); *H04N 13/207* (2018.05); *H04N 13/271* (2018.05); *H04N 13/254* (2018.05); *H04N 13/257* (2018.05); *H04N 2013/0077* (2013.01)

(58) Field of Classification Search
CPC ........... H04N 5/232121; H04N 5/2256; H04N 5/332; H04N 13/207; H04N 2013/0077; H04N 13/257; H04N 13/254; H04N 5/23212; H04N 5/33; G01B 11/25
USPC .......................................................... 382/154
See application file for complete search history.

(56) References Cited

U.S. PATENT DOCUMENTS

| | | | |
|---|---|---|---|
| 2015/0304631 A1* | 10/2015 | Lee | H04N 13/254 348/46 |
| 2015/0381963 A1* | 12/2015 | Dal Mutto | H04N 13/214 348/46 |
| 2017/0026632 A1* | 1/2017 | Ishiga | H04N 13/257 |
| 2017/0150019 A1* | 5/2017 | Kyung | H04N 9/04553 |
| 2017/0237960 A1* | 8/2017 | Kamm | H04N 5/332 348/46 |

* cited by examiner

3D DEPTH IMAGE ACQUIRING METHOD AND APPARATUS, AND IMAGE ACQUISITION DEVICE

CROSS-REFERENCE TO RELATED APPLICATIONS

The present application claims priority to Chinese Patent Application No. 201711407809.6, filed with the Chinese Patent Office on Dec. 22, 2017, and entitled "3D Depth Image Acquiring Method and Apparatus", which is herein incorporated by reference in its entirety.

TECHNICAL FIELD

The present disclosure relates to the technical field of picture information processing, and in particular to a 3D depth image acquiring method and apparatus (a method and an apparatus for acquiring a 3D depth image), and an image acquisition device.

BACKGROUND ART

In Apple iPhone X, a 3D depth sensing system (True Depth Camera System) is used to develop the Face ID function. In the 3D depth sensing technology, 30,000 infrared laser dots are projected to the face through an infrared laser structured light projection component (Dot projector—Structured light transmitter), and then an infrared light dot picture of a face is picked up by an infrared camera (Infrared camera-Structured light receiver) so as to establish a 3D depth facial image map using an algorithm.

The above algorithm must require an NIR (Near Infrared) image as a basis for performing mathematical space deconstruction using the light-dot size and shape, and a light-dot structure group. Therefore, the 3D depth sensing system must have an infrared camera and a color camera independent of each other, the infrared camera is used to acquire NIR images, and the color camera is used to acquire general pictures, such as visible light images, etc.

Although a 3D depth facial image map can be established in the way described above, the separately arranged infrared camera occupies the spatial resource of the image acquisition device.

SUMMARY

In order to at least partially overcome the above deficiencies in the prior art, embodiments of the present disclosure provide a 3D depth image acquiring method and apparatus, and an image acquisition device, in which an NIR image can be obtained without separately arranging an infrared camera in the image acquisition device, thereby avoiding the occupation of the spatial resource of the image acquisition device by the separate infrared camera, and moreover the obtained optimum NIR image and optimum VIS image can be processed to obtain a 3D depth image to meet user's requirements.

Embodiments of the present disclosure provide a 3D depth image acquiring method, applied to an image acquisition device, the image acquisition device comprising a visible light-infrared light (VIS-NIR) picture sensor and an infrared structured light projection component, the VIS-NIR picture sensor comprising a plurality of dot matrix units, with a blue light photosensitive component, a green light photosensitive component, a red light photosensitive component, and an NIR photosensitive component being distributed on each of the dot matrix units, and the method comprising:

controlling the NIR photosensitive component and the infrared structured light projection component to operate, to obtain a plurality of NIR images, and obtaining an optimum NIR image from the plurality of NIR images;

controlling the blue light photosensitive component, the green light photosensitive component, and the red light photosensitive component to operate, to obtain a plurality of VIS images, and obtaining an optimum VIS image from the plurality of VIS images;

performing calculation on the optimum NIR image by using a 3D depth mode to obtain a depth image; and processing the depth image and the optimum VIS image to obtain a 3D depth image.

Embodiments of the present disclosure also provide a 3D depth image acquiring apparatus, applied to an image acquisition device comprising a VIS-NIR picture sensor and an infrared structured light projection component, the VIS-NIR picture sensor comprising a plurality of dot matrix units, and a blue light photosensitive component, a green light photosensitive component, a red light photosensitive component, and an NIR photosensitive component being distributed on each of the dot matrix units, and the apparatus comprising:

an acquisition module configured for controlling the NIR photosensitive component and the infrared structured light projection component to operate, to obtain a plurality of NIR images, and obtaining an optimum NIR image from the plurality of NIR images, wherein the acquisition module is further configured for controlling the blue light photosensitive component, the green light photosensitive component, and the red light photosensitive component to operate, to obtain a plurality of VIS images, and obtaining an optimum VIS image from the plurality of VIS images;

a calculation module configured to perform calculation on the optimum NIR image by using a 3D depth mode to obtain a depth image; and a processing module configured to process the depth image and the optimum VIS image to obtain a 3D depth image.

Embodiments of the present disclosure also provides an image acquisition device, comprising a VIS-NIR picture sensor and an infrared structured light projection component, the VIS-NIR picture sensor comprising a plurality of dot matrix units, each of the dot matrix units comprising a blue light photosensitive component, a green light photosensitive component, a red light photosensitive component, and an NIR photosensitive component;

the infrared structured light projection component being configured to project infrared structured light to a surface of a to-be-photographed object;

the VIS-NIR picture sensor being configured for controlling the NIR photosensitive component in each of the dot matrix units to operate to acquire infrared structured light reflected by the surface of the to-be-photographed object, to obtain a plurality of NIR images and determine an optimum NIR image from the plurality of NIR images, and for controlling the blue light photosensitive component, the green light photosensitive component and the red light photosensitive component of each of the dot matrix units to acquire visible light reflected by the surface of the to-be-photographed object, to obtain a plurality of VIS images and determine an optimum VIS image from the plurality of VIS images; and the VIS-NIR picture sensor being further configured for performing calculation on the optimum NIR image by using a 3D depth mode to obtain a depth image, and processing the depth image and the optimum VIS image to obtain a 3D depth image.

The embodiments of the present disclosure provide the 3D depth image acquiring method and apparatus, and the method is applied to the image acquisition device. The image acquisition device comprises a VIS-NIR picture sensor and an infrared structured light projection component, the VIS-NIR picture sensor comprises a plurality of dot matrix units. A blue light photosensitive component, a green light photosensitive component, a red light photosensitive component, and an NIR photosensitive component are distributed on each of the dot matrix units. A plurality of NIR images may be obtained by controlling the NIR photosensitive component and the infrared structured light projection component to operate, and then an optimum NIR image is selected from the plurality of NIR images. Calculation is performed on the optimum NIR image by a 3D depth mode to obtain a depth image. A plurality of VIS images may be obtained by controlling the blue light photosensitive component, the green light photosensitive component and the red light photosensitive component to operate, and then an optimum VIS image is selected from the plurality of VIS images. The depth image and the optimum VIS image are processed to obtain a 3D depth image. Thus, the NIR image can be obtained without separately arranging an infrared camera in the image acquisition device, thereby avoiding the occupation of the spatial resource of the image acquisition device by the separate infrared camera, and moreover the obtained optimum NIR image and optimum VIS image can be processed to obtain a 3D depth image to meet user's requirements.

In order to make the above objectives, features and advantages of the embodiments of the present disclosure more apparent and understandable, some embodiments of the present disclosure will be described in detail below by way of example with reference to the accompanying drawings.

BRIEF DESCRIPTION OF DRAWINGS

For illustrating technical solutions of embodiments of the present disclosure more clearly, drawings required for use in the embodiments will be introduced briefly below. It is to be understood that the drawings below are merely illustrative of some embodiments of the present disclosure, and therefore should not to be considered as limiting its scope. It would be understood by those of ordinary skill in the art that other relevant drawings could also be obtained from these drawings without any inventive efforts.

Figure 1:
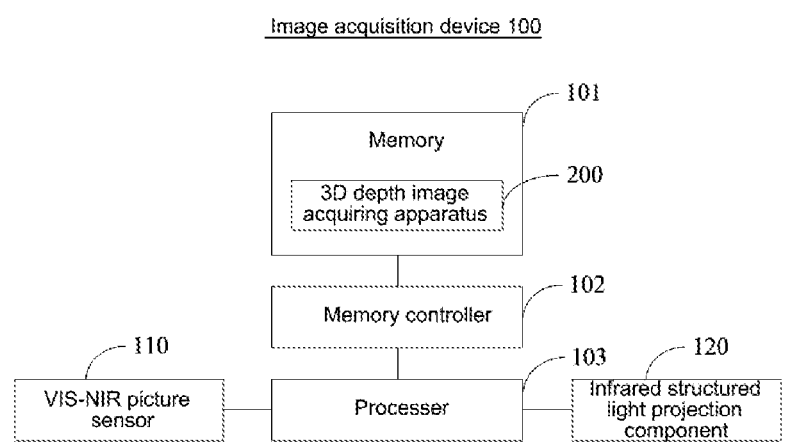
FIG. 1 is a block schematic diagram of an image acquisition device provided in embodiments of the present disclosure.

Reference Numerals: 100—image acquisition device; 101—memory; 102—memory controller; 103—processor; 110—VIS-NIR picture sensor; 112—dot matrix unit; 301—blue light photosensitive component; 302—green light photosensitive component; 303—red light photosensitive component; 304—NIR photosensitive component; 120—infrared structured light projection component; 130—lens; 151—optical filter; 153—fixation base; 154—protective cover; 200—3D depth image acquiring apparatus; 210—acquisition module; 211—control submodule; 212—selection submodule; 230—calculation module; 240—processing module.

DETAILED DESCRIPTION OF EMBODIMENTS

The technical solutions of the embodiments of the present disclosure will be described below clearly and completely with reference to the drawings of the embodiments of the present disclosure. It is apparent that the embodiments described are some, but not all of the embodiments of the present disclosure. Generally, the components of the embodiments of the present disclosure, as described and illustrated in the figures herein, may be arranged and designed in a wide variety of different configurations. Thus, the following detailed description of the embodiments of the present disclosure, as represented in the figures, is not intended to limit the scope of the present disclosure as claimed, but is merely representative of selected embodiments of the present disclosure. All the other embodiments obtained by those skilled in the art in light of the embodiments of the present disclosure without inventive efforts would fall within the scope of the present disclosure as claimed.

It should be noted that similar reference numerals and letters refer to similar items in the following figures, and thus once an item is defined in one figure, it may not be further defined or explained in the following figures. Moreover, in the description of the present disclosure, the terms such as "first" and "second" are only used for distinguishing the description, and should not be understood as an indication or implication of importance in relativity.

Some embodiments of the present disclosure will be described in detail below with reference to the accompanying drawings. The embodiments described below and the features in the embodiments can be combined with each other without conflict.

Referring to FIG. 1, FIG. 1 is a block schematic diagram of an image acquisition device 100 provided in embodiments of the present disclosure. In the embodiments of the present disclosure, the image acquisition device 100 may be, but not limited to, a smart phone, a tablet computer, or the like. The image acquisition device 100 comprises a memory 101, a memory controller 102, a processor 103, a VIS-NIR camera, an infrared structured light projection component 120 and a 3D depth image acquiring apparatus 200. Here, the VIS-NIR camera includes a VIS-NIR picture sensor 110.

The elements, i.e. the memory 101, the memory controller 102, the processor 103, the VIS-NIR picture sensor 110, and the infrared structured light projection component 120 are electrically connected directly or indirectly to one another to implement data transmission or interaction. For example, these elements may be electrically connected to one another through one or more communication buses or signal lines. A 3D depth image acquiring apparatus 200 is stored in the memory 101, and the 3D depth image acquiring apparatus 200 comprises at least one software functional module that can be stored in the memory 101 in the form of software or firmware. The processor 103 executes various functional applications and data processing, i.e., implements the 3D depth image acquiring method in the embodiment of the present disclosure, by running a software program and a module stored in the memory 101, such as the 3D depth image acquiring apparatus 200 in the embodiment of the present disclosure.

Here, the memory 101 may be, but not limited to, a random access memory (RAM), a read only memory (ROM), a programmable read-only memory (PROM), an erasable programmable read-only memory (EPROM), an electric erasable programmable read-only memory (EEPROM), or the like. Here, the memory 101 is used to store programs which are executed by the processor 103 after the processor receives an execution instruction. Access to the memory 101 by the processor 103 and other possible components can be performed under the control of the memory controller 102.

The processor 103 may be an integrated circuit chip with signal processing capability. The processor 103 described above may be a general-purpose processor, including a central processing unit (CPU), a network processor (NP), and the like. It may also be a digital signal processor (DSP), an application-specific integrated circuit (ASIC), a field programmable gate array (FPGA) or any other programmable logic device, discrete gate or transistor logic device, or discrete hardware component. The methods, steps, and logical block diagrams disclosed in the embodiments of the present disclosure can be implemented or executed. The general-purpose processor may be a microprocessor, or the processor may also be any conventional processor or the like.

Figure 2:
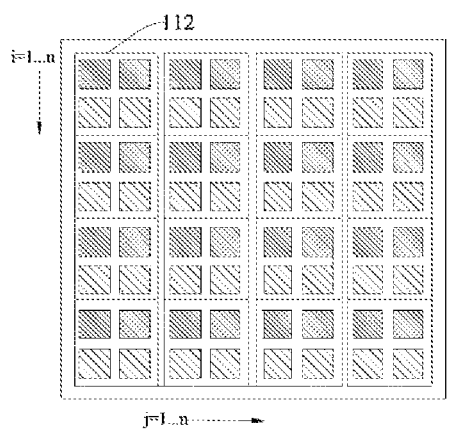
FIG. 2 is a schematic structural diagram of a VIS-NIR picture sensor of FIG.
Figure 3:
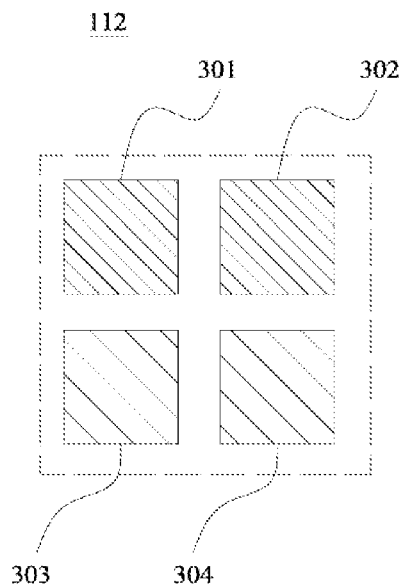
FIG. 3 is a schematic structural diagram of a dot matrix unit shown in FIG. 2.

Referring to FIG. 2, FIG. 2 is a schematic structural diagram of a VIS-NIR picture sensor 110 of FIG. 1. The VIS-NIR picture sensor 110 may be a CCD (Charge-coupled Device) picture sensor, or may also be a CMOS (Complementary Metal Oxide Semiconductor) picture sensor. The VIS-NIR picture sensor 110 comprises a plurality of dot matrix units 112. Referring to FIG. 3, a blue light photosensitive component 301, a green light photosensitive component 302, a red light photosensitive component 303, and an NIR photosensitive component 304 are distributed on each of the dot matrix units 112. It should be indicated that the positions of the blue light photosensitive component 301, the green light photosensitive component 302, the red light photosensitive component 303 and the NIR photosensitive component 304 are exemplary. Here, silicon-based components, copper-indium-gallium-selenide semiconductor (CuInGaSe2) components, low-band gap (Energy Gap <1 eV, materials such as gallium arsenide (belonging to Groups III to V) GaAs, InGaAS, PbS, and $Si_xGe_y$ mixed compounds, and HgTe) components, organic photosensitive components (Organic Photoconductive Film), and the like may be used as the foregoing respective photosensitive components. An image of a to-be-photographed object can be obtained by the respective photosensitive components in the respective dot matrix units 112.

It is worth noting that when a copper-indium-gallium-selenide semiconductor (CuInGaSe2) component is used, a good photosensitive effect can be achieved since the quantum efficiency of the copper-indium-gallium-selenide semiconductor (CuInGaSe2) component at an infrared light waveband of 940 nm is about 8 times that of silicon.

The infrared structured light projection component 120 is configured to project structured light to a to-be-photographed object so as to obtain an NIR image through the NIR photosensitive component. Here, a set of projected light beams in known spatial directions is called structured light.

It will be understood that the structure shown in FIG. 1 is merely schematic, and the image acquisition device 100 may also comprise more or less components than those shown in FIG. 1, or have a configuration different from that shown in FIG. 1. The components shown in FIG. 1 may be implemented using hardware, software, or a combination thereof.

Figure 4:
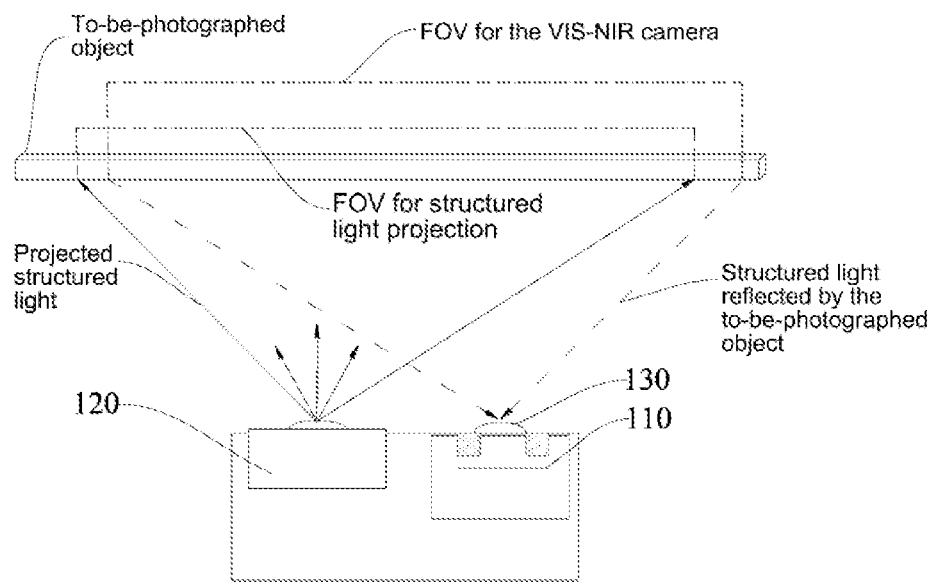
FIG. 4 is a schematic diagram showing application of an image acquisition device provided in embodiments of the present disclosure.

Referring to FIG. 4, FIG. 4 is a schematic diagram showing application of an image acquisition device 100 provided in embodiments of the present disclosure. The image acquisition device 100 further comprises a lens 130. The infrared structured light projection component 120 projects structured light to a to-be-photographed object, and the VIS-NIR picture sensor 110 obtains a picture of the to-be-photographed object from the structured light reflected by the to-be-photographed object through the lens 130. Here, in FIG. 4, FOV (instantaneous Field of View) for structured light projection refers to an image of the to-be-photographed object obtained when viewed from the infrared structured light projection component 120, and FOV for the VIS-NIR camera refers to an image of the to-be-photographed object obtained when viewed from the VIS-NIR picture sensor 110.

Figure 5:
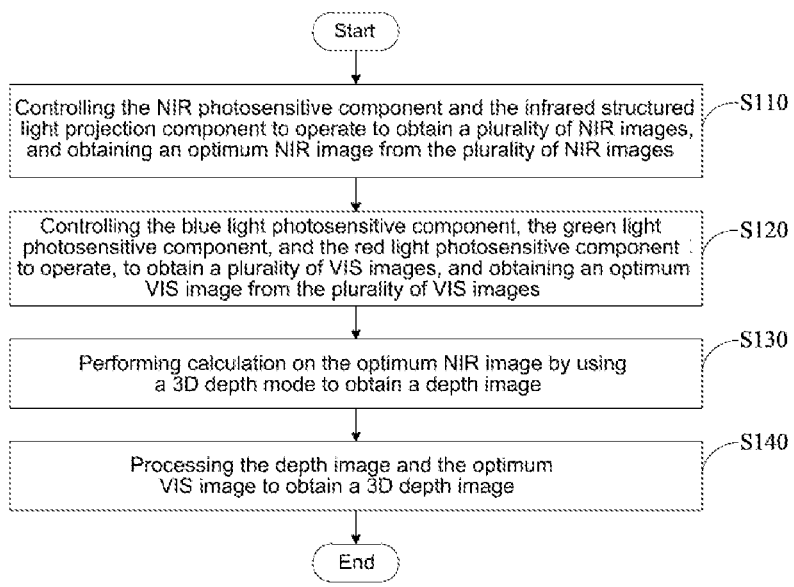
FIG. 5 is a schematic flowchart of a 3D depth image acquiring method provided in embodiments of the present disclosure.

Referring to FIG. 5, FIG. 5 is a schematic flowchart of a 3D depth image acquiring method provided in embodiments of the present disclosure. The method is applied to the image acquisition device 100. The specific procedures of the 3D depth image acquiring method will be explained in detail below.

In Step S110, the NIR photosensitive component and the infrared structured light projection component 120 are controlled to operate to obtain a plurality of NIR images, and an optimum NIR image is obtained from the plurality of the NIR images.

In an implementation, the image acquisition device 100 may further comprise a focusing part and a lens, and in this case, Step S110 may include the following sub-steps:

controlling the infrared structured light projection component to project infrared structured light to a surface of a to-be-photographed object, and controlling the NIR photosensitive component in each of the dot matrix units to operate to acquire infrared structured light reflected by the surface of the to-be-photographed object to obtain an NIR image; and adjusting to a plurality of different values, by the focusing part, a distance between the VIS-NIR picture sensor and the lens, during the process of acquiring infrared structured light reflected by the surface of the to-be-photographed object, to obtain the plurality of NIR images respectively corresponding to the plurality of different values.

Here, the distance between the VIS-NIR picture sensor and the lens is a focal length, and the obtained plurality of NIR images are NIR images at different focal lengths. After a plurality of NIR images at different focal lengths are obtained, an optimum NIR image can be determined therefrom for subsequent steps.

Optionally, in the present embodiment, the focusing part may include a focusing motor electrically connected to the processor 103, and the processor 103 may drive the focusing motor to operate through a corresponding driving circuit.

Figure 6:
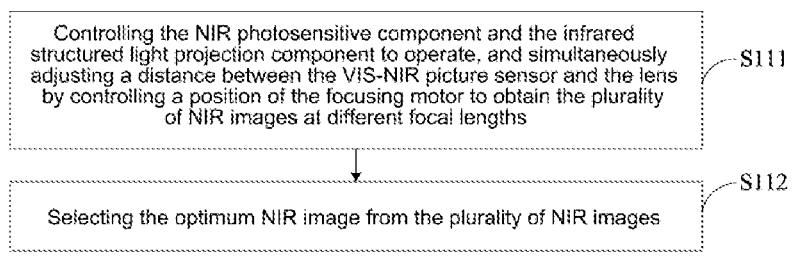
FIG. 6 is a schematic flowchart of sub-steps included in Step S110 of FIG. 5.
Figure 7:
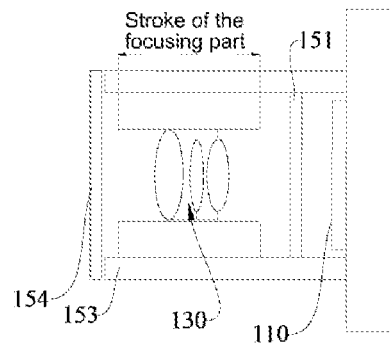
FIG. 7 is a schematic structural diagram of a VIS-NIR camera provided in embodiments of the present disclosure.

Referring to FIG. 6 and FIG. 7, in another implementation, Step S110 may include sub-steps as shown in FIG. 6, and FIG. 7 is a schematic structural diagram of a VIS-NIR camera provided in embodiments of the present disclosure. The image acquisition device 100 further comprises a focusing motor that is electrically connected to the processor 103. Step S110 may comprise Sub-step S111 and Sub-step S112.

In sub-step S111, the NIR photosensitive component and the infrared structured light projection component 120 are controlled to operate, and simultaneously the distance between the VIS-NIR picture sensor 110 and the lens 130 is adjusted by controlling the position of the focusing motor, to obtain the plurality of NIR images at different focal lengths.

In the present embodiment, the NIR photosensitive component and the infrared structured light projection component 120 are controlled to enter an operating state (i.e. controlled to operate), and simultaneously the plurality of NIR images are obtained by automatic focusing. Specifically, the distance between the VIS-NIR picture sensor 110 and the lens 130 is adjusted by controlling the position of the focusing motor, thereby obtaining the plurality of NIR images at different focal lengths.

Optionally, in the present embodiment, the focusing motor may be controlled to rotate by one focusing stroke, to obtain a plurality of NIR images. As shown in FIG. 7, a plurality of NIR images are obtained during the movement of the lens 130 by one stroke of the focusing part.

Further referring to FIG. 7, the VIS-NIR camera may comprise a VIS-NIR picture sensor 110, an optical filter 151, a fixation base 153, and a protective cover 154. Light sequentially passes through the protective cover 154, the lens 130, and the optical filter 151 and is projected onto the VIS-NIR picture sensor 110. Here, the optical filter 151 is an optical device for selecting a desired radiation waveband. All the optical filters can absorb certain wavelengths, thereby making the object darker.

In Sub-step S112, the optimum NIR image is selected from the plurality of NIR images.

The optimum NIR image may be obtained by contrast focusing, phase focusing, or the like. The obtaining of the optimum NIR image by contrast focusing will be explained below.

Here, contrast focusing is focusing through a contrast of an image. In general, the greater the contrast is, the clearer the image is. In the contrast focusing, the focusing motor is required to rotate by one focusing stroke, and an optimum image is selected based on a brightness contrast value of the image from a plurality of images corresponding to the focusing stroke.

Figure 8:
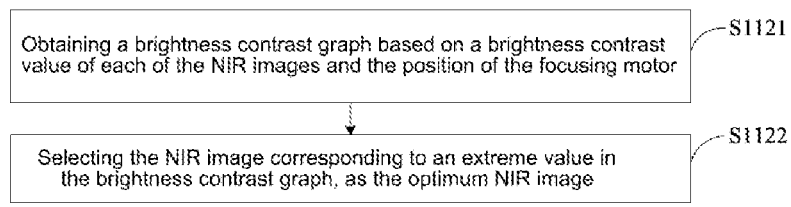
FIG. 8 is a schematic flowchart of sub-steps included in Sub-step S112 of FIG. 6.

Referring to FIG. 8, FIG. 8 is a schematic flowchart of sub-steps included in Sub-step S112 of FIG. 6. Sub-step S112 may include Sub-step S1121 and Sub-step S1122.

In Sub-step S1121, a brightness contrast graph is obtained based on a brightness contrast value of each of the NIR images and the position of the focusing motor.

In the present embodiment, while the NIR image is being acquired, the position of the focusing motor corresponding to the NIR image is simultaneously obtained. A brightness contrast graph is obtained based on the brightness contrast value of each of the NIR images and the position of the focusing motor. Here, the brightness contrast value refers to a difference between the largest brightness value (i.e. the brightness value obtained when the brightness is brightest) and the smallest brightness value (i.e. the brightness value obtained when the brightness is darkest) in a preset focus area, and the preset focus area may be a block, a point or a line. The position of the focusing motor represents the distance between the lens 130 and the VIS-NIR picture sensor 110.

In Sub-step S1122, the NIR image corresponding to an extreme value in the brightness contrast graph is taken as the optimum NIR image.

In the present embodiment, in optimum imaging, the brightness contrast value of the plurality of NIR images obtained in one focusing stroke is maximum or minimum, that is to say, there is only one optimum imaging plane in one focusing stroke. After the brightness contrast graph is obtained, an extreme value can be obtained according to the trend of change in brightness contrast value in the graph, and the NIR image corresponding to the extreme value is taken as the optimum NIR image. Here, the extreme value may be a maximum value of the brightness contrast values or a minimum value of the brightness contrast values.

Figure 9:
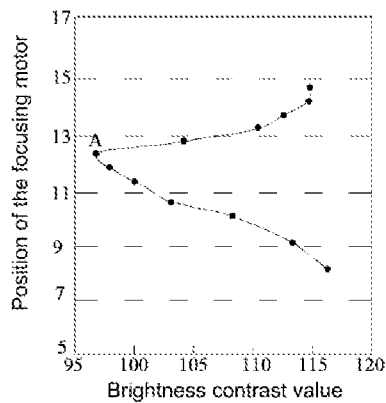
FIG. 9 is a schematic diagram of a brightness contrast graph.

Referring to FIG. 9, FIG. 9 is a schematic diagram of a brightness contrast graph. In the graph, the abscissa represents the brightness contrast value, and the ordinate represents the position of the focusing motor, and a brightness contrast graph is obtained based on the above settings and the brightness contrast value of each NIR image and the position of the focusing motor. As can be seen from FIG. 9, the extreme value of the brightness contrast value corresponds to a peak point A, and thus the optimum NIR image is obtained based on the point A.

In the present embodiment, the optimum NIR image may also be selected from the plurality of NIR images by phase focusing. Next, the phase focusing will be explained.

When the optimum NIR image is obtained by phase focusing, the focusing motor does not have to rotate by one focusing stroke. In the phase focusing, it is judged, through a linear signal of phase detection, whether the current focus position is in the front or in the back, so as to control the rotation of the focusing motor, and so that at the accurate focus position, the VIS-NIR camera can accurately know that it is currently in an in-focus position, and the focusing motor is controlled to stop rotating, and an image corresponding to the in-focus position is taken as an optimum NIR image.

In Step S120, the blue light photosensitive component, the green light photosensitive component, and the red light photosensitive component are controlled to operate to obtain a plurality of VIS images, and an optimum VIS image is obtained from the plurality of VIS images.

In an implementation, Step S120 may include the following sub-steps:

controlling the blue light photosensitive component, the green light photosensitive component, and the red light photosensitive component in each of the dot matrix units to operate to acquire blue light, green light and red light reflected by the surface of the to-be-photographed object; and adjusting the distance between the VIS-NIR picture sensor and the lens, to a plurality of different values, by the focusing part during the process of acquiring the blue light, green light, and red light reflected by the surface of the to-be-photographed object, to obtain the plurality of VIS images respectively corresponding to the plurality of different values.

In this case, the obtained plurality of VIS images are VIS images at different focal lengths, and thereafter an optimum VIS image can be determined therefrom for subsequent steps.

Figure 10:
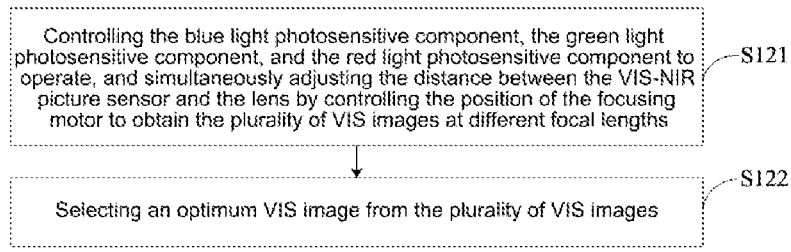
FIG. 10 is a schematic flowchart of sub-steps included in Step S120 of FIG. 5.

Referring to FIG. 10, in another implementation, Step S120 in FIG. 5 may include sub-steps shown in FIG. 10. Step S120 may include Sub-step S121 and Sub-step S122.

In Sub-step S121, the blue light photosensitive component, the green light photosensitive component, and the red light photosensitive component are controlled to operate, and simultaneously the distance between the VIS-NIR picture sensor 110 and the lens 130 is adjusted by controlling the position of the focusing motor, to obtain the plurality of VIS images at different focal lengths.

In Sub-step S122, an optimum VIS image is selected from the plurality of VIS images.

In the present embodiment, the blue light photosensitive component, the green light photosensitive component, and the red light photosensitive component are controlled to enter an operating state, and simultaneously the position of the focusing motor is adjusted by automatic focusing, thereby adjusting the distance between the VIS-NIR picture sensor 110 and the lens 130, to obtain the plurality of VIS (visible light) images at different focal lengths.

In the present embodiment, the optimum VIS image may be obtained by contrast focusing, phase focusing, or the like. Here, the contrast focusing comprises obtaining a brightness contrast graph of the VIS images based on the brightness contrast value of each VIS image and the position of the focusing motor, and selecting a VIS image, which is corresponding to an extreme value from the brightness contrast graph of the VIS images, as the optimum VIS image. The phase focusing comprises controlling the rotation of the focusing motor based on the phase of each VIS image, to control the focusing motor to stop rotating at an in-focus position, and taking a VIS image corresponding to the in-focus position as the optimum VIS image.

In an implementation of the present embodiment, the dot matrix unit 112 may also be preset to output a VIS image signal or to output an NIR image signal.

Reference may be made to the above description of Step S110 for a specific description of Step S120.

In the present embodiment, the NIR image and the VIS image may be obtained simultaneously in one focusing stroke, or the NIR image and the VIS image may also be obtained in multiple focusing strokes (for example, a plurality of NIR images are obtained in one focusing stroke, and a plurality of VIS images are obtained in another focusing stroke), or the above two processes may also be performed alternately. The specific order in which the NIR image and the VIS image are obtained is not limited here.

In some implementations, a visible light sensor and a near-infrared light sensor are usually arranged independently of each other, rather than being arranged together, because when the visible light sensor and the near-infrared light sensor are arranged together, light must enter through one lens, whereas light of different wavelengths has different refractive indexes in the lens material, thereby leading to different imaging focal lengths required for the light of different wavelengths, i.e., a so-called dispersion effect. In this case, if the visible light sensor and the near-infrared light sensor are arranged together, the optimum VIS image and the optimum NIR image cannot be obtained at the same time.

With the above design of the embodiment of the present disclosure, the visible light photosensitive components (i.e., the blue light photosensitive component, the green light photosensitive component, and the red light photosensitive component) and the NIR (near-infrared light) photosensitive component are arranged as a whole, and then NIR images and VIS images at different focal lengths are acquired by changing the focal length, and an optimum NIR image is selected from the obtained NIR images and an optimum VIS image is selected from the obtained VIS images, thereby avoiding poor imaging due to the dispersion effect. Accordingly, a single picture sensor having visible-light and near-infrared-light photosensitive pixels is actually achieved, which is more convenient than the separate arrangement of the visible light sensor and the near-infrared light sensor.

In addition, the VIS-NIR picture sensor provided in the embodiment of the present disclosure greatly reduces the cost and the volume occupied by the lens group, compared with the existing method of improving the dispersion effect by a low dispersion material or multiple lenses or an aspherical lens.

In Step S130, the optimum NIR image is subjected to calculation by using a 3D depth mode, to obtain a depth image.

In the present embodiment, tens of thousands of specialized NIR light dots are projected from the structured light projected by the infrared structured light projection component 120, and then a plurality of NIR images are obtained by the VIS-NIR picture sensor 110. After the optimum NIR image is selected, each structured light groups is analyze, x and y coordinates are obtained based on each structured light group and a database pre-stored in the image acquisition device 100, and then z is obtained by calculation using a change in dot-dot distance in each structured light group, the brightness, and the like, so as to be combined into (x, y, z) to obtain the depth image. Here, each structured light group has a different structure. The depth image is also referred to as a distance image, which refers to an image in which the distance (depth) from the VIS-NIR picture sensor 110 to each point of a to-be-photographed object is used as a pixel value, and the depth image reflects geometric data about the visible surface of the to-be-photographed object.

In Step S140, the depth image and the optimum VIS image are processed to obtain a 3D depth image.

In the present embodiment, the VIS-NIR picture sensor 110 comprises a blue light photosensitive component, a green light photosensitive component, a red light photosensitive component, and an NIR photosensitive component, therefore the depth image is on the same axial plane as the optimum VIS image, and the depth image and the optimum VIS image can be subjected to image fitting or convolutional neural network (CNN) fitting to obtain the 3D depth image.

Here, since the imaging axis of the depth image is on the same axial plane as the imaging axis of the optimum VIS image, and there is no problems such as rotation and inclination of the to-be-photographed object, the 3D depth image can be relatively easily synthesized from the depth image and the optimum VIS image.

Referring again to FIG. 2, i represents a row address value, and j represents a column address value. The VIS-NIR picture sensor 110 can obtain an NIR image and a VIS image. When only the NIR image is acquired, the output NIR signal may be represented as S(i, j, nir); and when only the VIS image is acquired, the output VIS signal may be represented as S(i, j, b, g, r). Here, b represents a measured value for blue light, g represents a measured value for green light, r represents a measured value for red light, and nir represents a measured value for infrared light. An optimum NIR image M(i, j, nir) is selected from a plurality of S(i, j, nir), and an optimum VIS image M(i, j, b, g, r) is selected from a plurality of S(i, j, b, g, r). The M(i, j, nir) is subjected to calculation using the 3D depth mode to obtain a depth image (i, j, d). The depth image and the optimum VIS image are subjected to image fitting or convolutional neural network fitting to obtain a 3D depth image, i.e., M(i, j, b, g, r)×M(i, j, d)=M(i, j, b, g, r, d).

With the above method, the current two cameras can be replaced with only one VIS-NIR camera, which saves expenses while avoiding the occupation of the spatial resource of the image acquisition device 100 by the separately-arranged infrared camera, and also avoids the dispersion effect to some extent because of the foregoing design for selection of the optimum image. In addition, the VIS-NIR camera comprises a blue light photosensitive component, a green light photosensitive component, a red light photosensitive component, and an NIR photosensitive component, thus the obtained depth image and optimum VIS image can be synthesized into a 3D depth image more conveniently.

Figure 11:
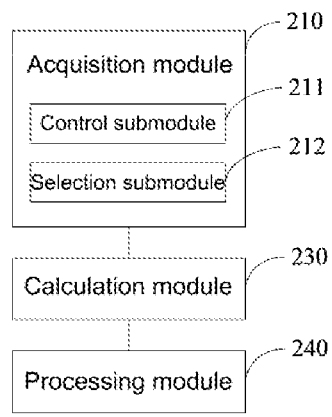
FIG. 11 is a block schematic diagram of a 3D depth image acquiring apparatus provided in embodiments of the present disclosure.

Referring to FIG. 11, FIG. 11 is a block schematic diagram of a 3D depth image acquiring apparatus 200 provided in embodiments of the present disclosure. The 3D depth image acquiring apparatus 200 is applied to an image acquisition device 100. The image acquisition device 100 comprises a VIS-NIR picture sensor 110 and an infrared structured light projection component 120. The VIS-NIR picture sensor 110 comprises a plurality of dot matrix units 112, and a blue light photosensitive component, a green light photosensitive component, a red light photosensitive component, and an NIR photosensitive component are distributed on each of the dot matrix units 112. The 3D depth image acquiring apparatus 200 may comprise an acquisition module 210, a calculation module 230, and a processing module 240.

The acquisition module 210 is configured for controlling the NIR photosensitive component and the infrared structured light projection component 120 to operate, to obtain a plurality of NIR images, and obtaining an optimum NIR image from the plurality of NIR images.

In a specific implementation, the image acquisition device 100 may further comprise a focusing part and a lens 130. On this basis, the acquisition module 210 may comprise an NIR image acquisition submodule and a focal-length adjusting submodule.

Here, the NIR image acquisition submodule is configured for controlling the infrared structured light projection component to project infrared structured light to a surface of a to-be-photographed object, and controlling the NIR photosensitive component in each of the dot matrix units to operate to acquire infrared structured light reflected by the surface of the to-be-photographed object, to obtain an NIR image.

The focal-length adjusting submodule is configured to adjust by the focusing part a distance between the VIS-NIR picture sensor and the lens to a plurality of different values during the process of acquiring infrared structured light reflected by the surface of the to-be-photographed object, to obtain the plurality of NIR images respectively corresponding to the plurality of different values.

Optionally, the focusing part may be a focusing motor, and in this case, the focal-length adjusting submodule is specifically configured for controlling the focusing motor to rotate by one focusing stroke, and obtaining the plurality of NIR images by the VIS-NIR picture sensor during the rotation of the focusing motor.

In another specific implementation, the acquisition module 210 may comprise a control submodule 211 and a selection submodule 212.

The control submodule 211 is configured for controlling the NIR photosensitive component and the infrared structured light projection component to operate, and simultaneously adjusting the distance between the VIS-NIR picture sensor 110 and the lens 130 by controlling the position of the focusing motor, to obtain the plurality of NIR images at different focal lengths.

The selection submodule 212 is configured to select the optimum NIR image from the plurality of NIR images.

In an implementation of the present embodiment, the selection submodule 212 selects the optimum NIR image from the plurality of NIR images in a manner including:

obtaining a brightness contrast graph based on a brightness contrast value of each of the NIR images and the position of the focusing motor; and selecting the NIR image, which is corresponding to an extreme value in the brightness contrast graph, as the optimum NIR image.

In the above implementation, the manner, in which the control submodule 211 adjusts the distance between the VIS-NIR picture sensor 110 and the lens 130 by controlling the position of the focusing motor to obtain the plurality of NIR images at different focal lengths, includes:

controlling the focusing motor to rotate by one focusing stroke to obtain the plurality of NIR images.

In yet another implementation of the present embodiment, the manner, in which the selection submodule 212 selects the optimum NIR image from the plurality of NIR images, includes:

selecting the optimum NIR image from the plurality of NIR images by phase focusing.

In the present embodiment, the acquisition module 210 is used to execute Step S110 in FIG. 5, and reference may be made to the detailed description of Step S110 in FIG. 5 for a specific description of the acquisition module 210.

The acquisition module 210 is further configured for controlling the blue light photosensitive component, the green light photosensitive component, and the red light photosensitive component to operate to obtain a plurality of VIS images, and obtaining an optimum VIS image from the plurality of VIS images.

In a specific implementation, the acquisition module 210 may comprise a VIS image acquisition submodule.

Here, the VIS image acquisition submodule is configured to control the blue light photosensitive component, the green light photosensitive component, and the red light photosensitive component in each of the dot matrix units to operate to acquire blue light, green light, and red light reflected by the surface of the to-be-photographed object.

The focal-length adjusting submodule is further configured to adjust by the focusing part the distance between the VIS-NIR picture sensor and the lens to a plurality of different values during the process of acquiring the blue light, green light, and red light reflected by the surface of the to-be-photographed object, to obtain the plurality of VIS images respectively corresponding to the plurality of different values.

In another specific implementation, the manner, in which the acquisition module 210 controls the blue light photosensitive component, the green light photosensitive component, and the red light photosensitive component to operate to obtain a plurality of VIS images and obtains an optimum VIS image from the plurality of VIS images, may include:

controlling the blue light photosensitive component, the green light photosensitive component, and the red light photosensitive component to operate, and simultaneously adjusting the distance between the VIS-NIR picture sensor 110 and the lens 130 by controlling the position of the focusing motor, to obtain the plurality of VIS images at different focal lengths; and selecting an optimum VIS image from the plurality of VIS images.

In the present embodiment, the acquisition module 210 is further used to execute Step S120 in FIG. 5, and reference may also be made to the detailed description of Step S120 in FIG. 5 for a specific description of the acquisition module 210.

The calculation module 230 is configured to perform calculation on the optimum NIR image by using a 3D depth mode to obtain a depth image.

In the present embodiment, the calculation module 230 is further used to execute Step S130 in FIG. 5, and reference may also be made to the detailed description of Step S130 in FIG. 5 for a specific description of the calculation module 230.

The processing module 240 is configured to process the depth image and the optimum VIS image to obtain a 3D depth image.

The manner, in which the processing module 240 processes the depth image and the optimum VIS image to obtain a 3D depth image, includes: performing image fitting or convolution neural network fitting on the depth image and the optimum VIS image to obtain the 3D depth image.

In the present embodiment, the processing module 240 is further used to execute Step S140 in FIG. 5, and reference may also be made to the detailed description of step S140 in FIG. 5 for a specific description of the processing module 240.

In summary, the embodiments of the present disclosure provide a 3D depth image acquiring method and apparatus, and an image acquisition device. The method is applied to an image acquisition device. The image acquisition device comprises a VIS-NIR picture sensor and an infrared structured light projection component, the VIS-NIR picture sensor comprises a plurality of dot matrix units, and a blue light photosensitive component, a green light photosensitive component, a red light photosensitive component, and an NIR photosensitive component are distributed on each of the dot matrix units. A plurality of NIR images may be obtained by controlling the NIR photosensitive component and the infrared structured light projection component to operate, and further an optimum NIR image is selected from the plurality of NIR images. The optimum NIR image is subjected to calculation by a 3D depth mode to obtain a depth image. A plurality of VIS images may be obtained by controlling the blue light photosensitive component, the green light photosensitive component and the red light photosensitive component to operate, and further an optimum VIS image is selected from the plurality of VIS images. The depth image and the optimum VIS image are processed to obtain a 3D depth image. Thus, the NIR image can be obtained without separately arranging an infrared camera in the image acquisition device, thereby avoiding the occupation of the spatial resource of the image acquisition device by the separate infrared camera, and moreover the obtained optimum NIR image and optimum VIS image can be processed to obtain a 3D depth image to meet user's requirements.

The above description is merely illustrative of selected embodiments of the present disclosure and is not intended to limit the present disclosure. It would be understood by those skilled in the art that various modifications and variations can be made to the present disclosure. Any modifications, equivalent alternatives, improvements and so on made within the spirit and principle of the embodiments of the present disclosure are to be included in the scope of protection of the present disclosure.

INDUSTRIAL APPLICABILITY

In the 3D depth image acquiring method and apparatus and the image acquisition device provided in the embodiments of the present disclosure, the current two cameras can be replaced with only one VIS-NIR camera, which saves expenses while avoiding the occupation of the spatial resource of the image acquisition device by the separately-arranged infrared camera, and the problem of poor imaging caused by the dispersion effect when the visible light sensor and the NIR sensor are arranged together can be avoided.

The invention claimed is:

1. A three dimensional (3D) depth image acquiring method, characterized by being applicable to an image acquisition device comprising a visible light-infrared light (VIS-NIR) picture sensor and an infrared structured light projection component, the VIS-NIR picture sensor comprising a plurality of dot matrix units, and a blue light photosensitive component, a green light photosensitive component, a red light photosensitive component, and an NIR photosensitive component being distributed on each of the dot matrix units, wherein the method comprises steps of:

controlling the NIR photosensitive component and the infrared structured light projection component to operate, so as to obtain a plurality of NIR images at different focal lengths, and obtaining an optimum NIR image from the plurality of NIR images;

controlling the blue light photosensitive component, the green light photosensitive component, and the red light photosensitive component to operate, so as to obtain a plurality of VIS images at different focal lengths, and obtaining an optimum VIS image from the plurality of VIS images; and performing calculation on the optimum NIR image by using a 3D depth mode to obtain a depth image; and processing the depth image and the optimum VIS image to obtain a 3D depth image.

2. The method according to claim 1, characterized in that the image acquisition device further comprises a focusing motor and a lens, and the step of controlling the NIR photosensitive component and the infrared structured light projection component to operate so as to obtain a plurality of NIR images at different focal lengths and obtaining an optimum NIR image from the plurality of NIR images comprises:

controlling the NIR photosensitive component and the infrared structured light projection component to operate, and simultaneously adjusting a distance between the VIS-NIR picture sensor and the lens by controlling a position of the focusing motor to obtain the plurality of NIR images at different focal lengths; and selecting the optimum NIR image from the plurality of NIR images.

3. The method according to claim 1, characterized in that the image acquisition device further comprises a focusing part and a lens; and the step of controlling the NIR photosensitive component and the infrared structured light projection component to operate so as to obtain a plurality of NIR images at different focal lengths comprises steps of:

controlling the infrared structured light projection component to project infrared structured light to a surface of a to-be-photographed object, and controlling the NIR photosensitive component in each of the dot matrix units to operate to acquire infrared structured light reflected by the surface of the to-be-photographed object, to obtain an NIR image; and adjusting to a plurality of different values, by the focusing part, a distance between the VIS-NIR picture sensor and the lens, during the process of acquiring infrared structured light reflected by the surface of the to-be photographed object, to obtain the plurality of NIR images at different focal lengths respectively corresponding to the plurality of different values.

4. The method according to claim 3, characterized in that the focusing part comprises a focusing motor; and the step of adjusting to a plurality of different values by the focusing part a distance between the VIS-NIR picture sensor and the lens to obtain the plurality of NIR images at different focal lengths respectively corresponding to the plurality of different values comprises:

controlling the focusing motor to rotate by one focusing stroke, and obtaining the plurality of NIR images at different focal lengths, by the VIS-NIR picture sensor, during the rotation of the focusing motor.

5. The method according to claim 4, characterized in that the step of obtaining an optimum NIR image from the plurality of the NIR images comprises:

obtaining a brightness contrast graph based on a brightness contrast value of each of the NIR images and a position of the focusing motor; and selecting an NIR image, which is corresponding to an extreme value in the brightness contrast graph, as the optimum NIR image.

6. The method according to claim 1, characterized in that the step of obtaining an optimum NIR image from the plurality of NIR images comprises:

selecting the optimum NIR image from the plurality of NIR images by phase focusing.

7. The method according to claim 3, characterized in that the step of controlling the blue light photosensitive component, the green light photosensitive component, and the red light photosensitive component to operate to obtain a plurality of VIS images at different focal lengths comprises:

controlling the blue light photosensitive component, the green light photosensitive component, and the red light photosensitive component in each of the dot matrix units to operate, to acquire blue light, green light and red light reflected by the surface of the to-be-photographed object; and adjusting to the plurality of different values, by the focusing part, the distance between the VIS-NIR picture sensor and the lens, during the process of acquiring the blue light, the green light, and the red light reflected by the surface of the to-be-photographed object, to obtain the plurality of VIS images at different focal lengths respectively corresponding to the plurality of different values.

8. The method according to claim 2, characterized in that the step of controlling the blue light photosensitive component, the green light photosensitive component, and the red light photosensitive component to operate so as to obtain a plurality of VIS images at different focal lengths and obtaining an optimum VIS image from the plurality of VIS images comprises:

controlling the blue light photosensitive component, the green light photosensitive component, and the red light photosensitive component to operate, and simultaneously adjusting the distance between the VIS-NIR picture sensor and the lens by controlling the position of the focusing motor, to obtain the plurality of VIS images at different focal lengths; and selecting an optimum VIS image from the plurality of VIS images.

9. The method according to claim 1, characterized in that the step of processing the depth image and the optimum VIS image to obtain a 3D depth image comprises:

performing image fitting or convolution neural network fitting on the depth image and the optimum VIS image to obtain the 3D depth image.

10. An image acquisition device, characterized by comprising a visible light-infrared light (VIS-NIR) picture sensor, an infrared structured light projection component, a memory and a processor, the VIS-NIR picture sensor, the infrared structured light projection component and the memory being electrically connected with the processor, wherein the VIS-NIR picture sensor comprises a plurality of dot matrix units, and each of the dot matrix units comprises a blue light photosensitive component, a green light photosensitive component, a red light photosensitive component, and an NIR photosensitive component;

the infrared structured light projection component is configured to project infrared structured light to a surface of a to-be-photographed object;

the VIS-NIR picture sensor is configured for controlling the NIR photosensitive component in each of the dot matrix units to operate to acquire infrared structured light reflected by the surface of the to-be-photographed object to obtain a plurality of NIR images at different focal lengths, and controlling the blue light photosensitive component, the green light photosensitive component, and the red light photosensitive component of each of the dot matrix units to acquire visible light reflected by the surface of the to-be-photographed object, to obtain a plurality of VIS images at different focal lengths;

the memory stores therein with instructions which, when being executed, cause the processor to:

determine an optimum NIR image from the plurality of NIR images;

determine an optimum VIS image from the plurality of VIS images; and perform calculation on the optimum NIR image by using a three dimensional (3D) depth mode to obtain a depth image, and process the depth image and the optimum VIS image to obtain a 3D depth image.

11. The image acquisition device according to claim 10, characterized in that the image acquisition device further comprises a focusing part and a lens; the focusing part is configured to adjust to a plurality of different values, when the VIS-NIR picture sensor acquires the infrared structured light reflected by the surface of the to-be-photographed object, a distance between the VIS-NIR picture sensor and the lens, to obtain the plurality of NIR images at different focal lengths respectively corresponding to the plurality of different values; and the focusing part is further configured to adjust to a plurality of different values, when the VIS-NIR picture sensor acquires the visible light reflected by the surface of the to-be-photographed object, the distance between the VIS-NIR picture sensor and the lens, to obtain the plurality of VIS images at different focal lengths respectively corresponding to the plurality of different values.

12. The image acquisition device according to claim 11, characterized in that the instructions, when being executed, further cause the processor to:
  obtain a brightness contrast graph based on a brightness contrast value of each of the NIR images and a position of the focusing motor; and
  select an NIR image, which is corresponding to an extreme value in the brightness contrast graph, as the optimum NIR image.

13. The image acquisition device according to claim 10, characterized in that the instructions, when being executed, further cause the processor to:
  select the optimum NIR image from the plurality of NIR images by phase focusing.

14. The image acquisition device according to claim 10, characterized in that the instructions, when being executed, further cause the processor to:
  perform image fitting or convolution neural network fitting on the depth image and the optimum VIS image to obtain the 3D depth image.

\* \* \* \* \*